Patented Jan. 1, 1929.

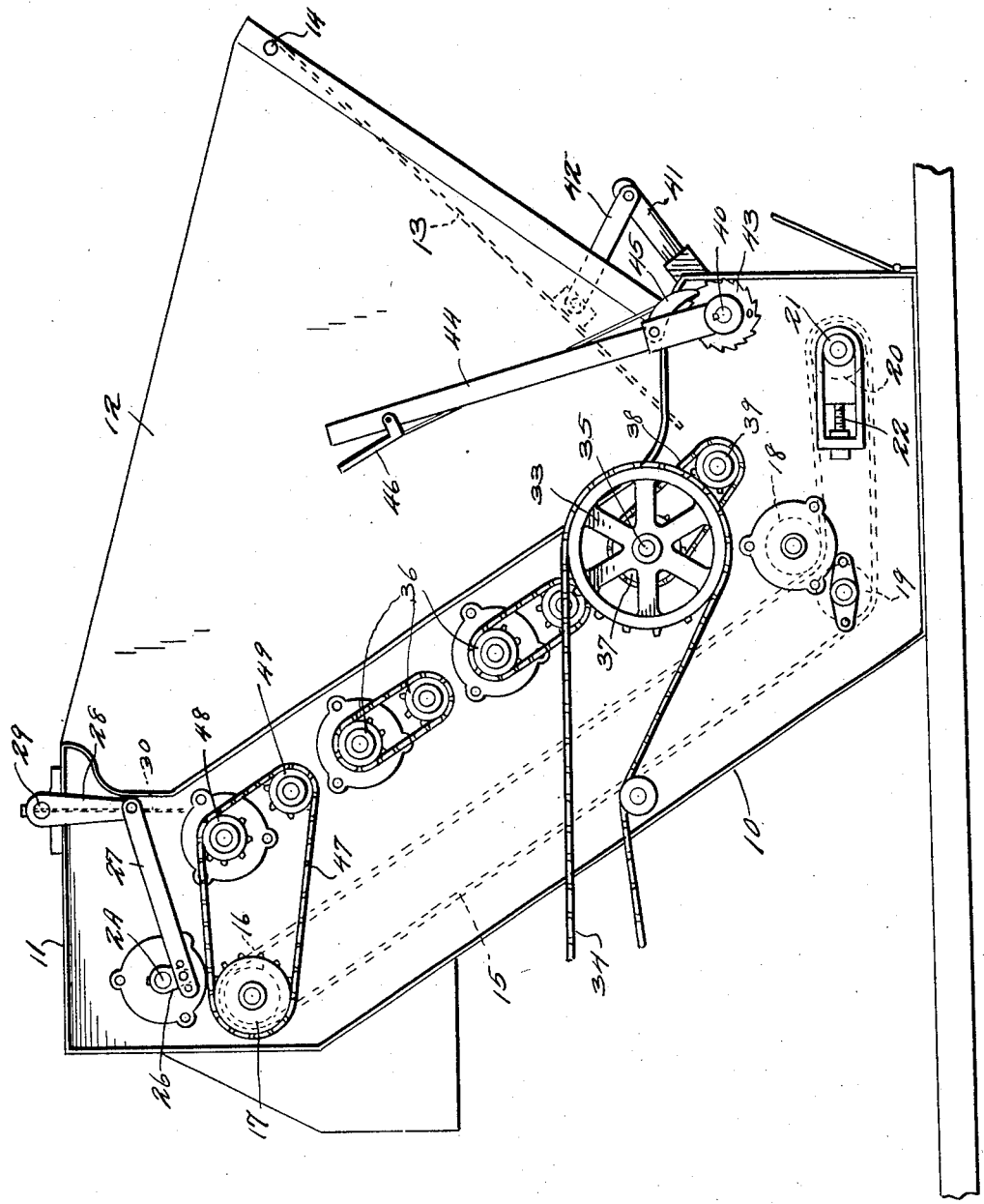

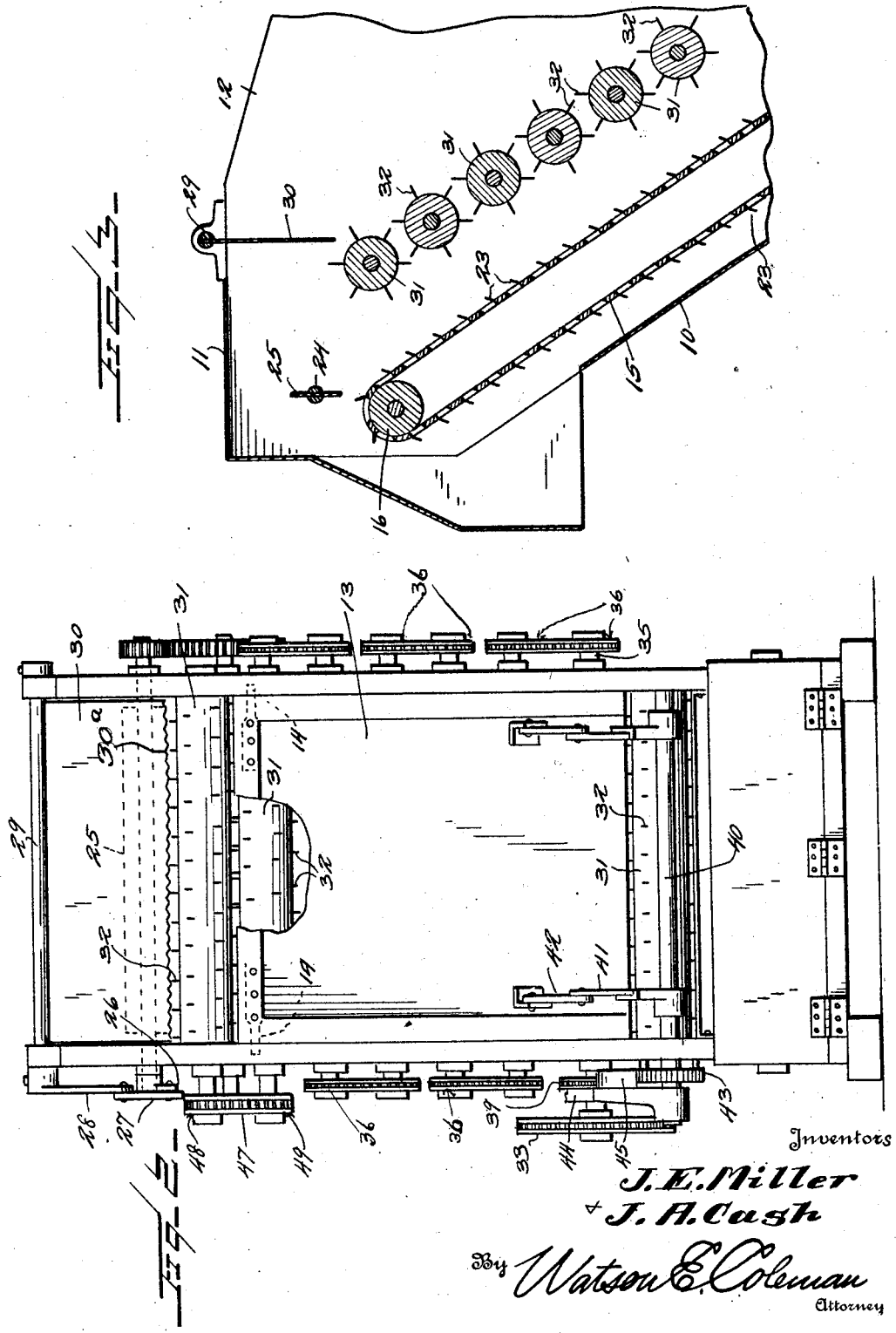

1,697,127

UNITED STATES PATENT OFFICE.

JAMES E. MILLER AND JAMES A. CASH, OF LOUISVILLE, KENTUCKY, ASSIGNORS TO FRED FRANKE & CO., OF LOUISVILLE, KENTUCKY, A CORPORATION OF KENTUCKY.

AUTOMATIC FEEDER FOR PICKERS, WILLOWS, ETC.

Application filed March 29, 1928. Serial No. 265,733.

This invention relates to automatic feeders or bale breakers for cotton pickers, "willows," cleaning machines, and the like.

In devices of this kind known to us, the cotton from the bale is thrown into a hopper, from which a spiked apron pulls away or "bites" off small pieces. There is considerable strain on this spiked apron, and one of the objects of the present invention is to relieve this strain on the apron and secure a much greater capacity by the provision of spiked rollers extending transversely across and above the apron by which the cotton is pulled out or broken from the bale and carried into the spiked apron, each roller thus "biting" off a part of the cotton in the hopper and these rollers rotating in different directions and at different speeds.

A further object is to provide for regulating the capacity of the machine. On all machines of this character known to us, the feeder will deliver a certain amount at all times. This is not satisfactory, as when a factory is using one feeder for four Garnett machines, for instance, then should one, two or three of these machines be shut down for any reason, the feeder overloads for the one machine which is running.

A further object of our invention is to provide a means for controlling or regulating this feed so as to permit a slowing down of the feed or an increase of the feed, and in this connection to provide a movable back to the hopper which may be set inward or outward along the series of spiked rollers so as to reduce the effective exposed area of these rollers.

Other objects have to do with the details of construction and arrangement of parts as will appear more fully hereinafter.

Our invention is illustrated in the accompanying drawings, wherein:—

Figure 1 is a side elevation of a feeder constructed in accordance with our invention;

Figure 2 is a front elevation thereof partly broken away;

Figure 3 is a fragmentary vertical section.

Referring to these drawings, 10 designates the back of a casing, this back extending upward and rearward and then straight upward and then downward to form the top of the casing, as at 11 and at the bottom extending longitudinally at 11ᵃ. The sides 12 extend outward from the casing to form a hopper, the front wall 13 of which is pivoted at 14, means being provided for holding this front wall in adjusted position, as will hereafter appear.

Disposed parallel to the wall 10 of the hopper is the endless apron 15 which at its upper end passes over a supporting roller 16 carrying upon it the sprocket wheel 17. Adjacent the lower end of the wall 10 of the casing the endless apron passes over the idle rollers 18 and 19, the shafts of which are mounted in suitable bearings in the lateral walls of the casing, and the endless apron then extends forward and over the roller 20 mounted in adjustable bearings 21 adjusted by means of screws 22 to take up any slack in the endless conveyor. This conveyor or belt may be constructed in any suitable manner but preferably of wooden slats attached to the links of the conveyor chains, and projecting from these slats are pins 23 which upon the upper flight of the conveyor are directed upwardly and are directed downwardly on the lower flight of the conveyor, this conveyor extending upward and rearward at an acute angle to a vertical plane and moves over a false bottom.

Disposed immediately above the upper roller 16 of the conveyor is the doffer shaft 24 carrying upon it the usual doffer 25. This doffer shaft carries upon it a crank 26 having a link 27 connecting the crank to an arm 28 extending downward from the rock shaft 29 and carrying the swinging member 30, the lower edge of which is toothed at 30ᵃ.

Disposed outward of the endless conveyor 15 are a series of spiked rollers 31. These rollers may be made of any suitable material and are each held upon the corresponding shaft by means of a transverse pin or rivet. Each roller has a plurality of staggered pins 32 projecting therefrom. As illustrated, there are eight of these rollers disposed in alignment with each other and disposed outward of the endless conveyor. The shaft of the second roller of the series carries upon the exterior of the casing a relatively large sprocket wheel 33 over which is trained the sprocket chain 34, which chain runs to any suitable source of power. The shaft 35 of this roller extends transversely across the machine and carries upon it a sprocket wheel 36. The shaft also carries upon it a sprocket wheel 37 from which a sprocket chain 38 extends to the sprocket wheel 39 on the shaft of the lowermost roller. Thus this lowermost roller is driven. The rollers 31 are arranged in pairs. Thus the shaft 35 drives by means of the sprocket wheel 36 and the sprocket chain drives the shaft of the next roller. This shaft on its opposite end carries a sprocket wheel 36 which, by means of a sprocket chain, engages the next adjacent sprocket wheel 36 on the next adjacent shaft, and this shaft at its opposite end is engaged with the next adjacent shaft of the series by means of a corresponding sprocket wheel and chain, and so on throughout the entire series of rollers 31.

For the purpose of driving the spiked apron 15, we provide the sprocket chain 47 which engages over two sprocket wheels 48 and 49 on the two upper roller shafts and which engage over the sprocket wheel 17 supporting the upper end of the spiked apron.

The shaft 24 may be driven in any suitable manner either by sprocket chains or by gears upon the upper conveyor shaft and upon the shaft 24. It will be seen that the spiked rollers 21 all rotate in the same direction but that the teeth of one spiked roller pass between the teeth of the other spiked roller and in the opposite direction to these teeth and these spiked rollers, therefore, act to tear apart the cotton and feed it to the conveyor belt 15 and that thus the strain of tearing apart the cotton and biting it out from the mass of cotton in the hopper is taken off the belt and is borne entirely by the spiked rollers. Inasmuch as these spiked rollers are mounted upon shafts which are supported in bearings at their opposite ends, it is obvious that these spiked rollers can more fully support the stress and strain of tearing the cotton apart and into small pieces than can a flexible belt or apron. Furthermore, these series of spiked rollers give the machine a much greater capacity as the cotton is fed to the spiked apron between each pair of rollers and is also fed to the apron at the bottom of the machine, that is, a certain amount of cotton will fall downward upon the horizontal portion of the apron.

As before remarked, the ordinary feeder feeds a certain amount of cotton at all times and this is not satisfactory, as no means are provided for changing the amount of cotton so fed. In order to regulate the feed, we provide the swinging lower wall 13 which is pivotally mounted at 14 so that this lower wall may be swung upward or outward to thus control the effective area of the breaking rollers.

The wall 13 is controlled by means of a shaft 40 having thereon an arm or arms 41. This arm extends outward and upward and is pivotally connected to a link 42, in turn pivotally engaged with the movable wall 13. Supported against rotation is a circular ratchet wheel 43 and coacting with this circular ratchet whele, which constitutes a sector, is a lever 44 mounted upon the shaft 40, this lever having a pawl 45 which coacts with the teeth on the ratchet wheel, this pawl being retracted by means of the hand grip 46 mounted upon the lever.

By releasing the pawl 45, the lever 44 may be moved outward to shift the wall 13 outward, but by pulling in upon the lever 44 the pawl will ride over the ratchet teeth, the movable wall will be forced inward, and then when the lever is released the wall will be held in this position. With this improvement, the wall of back 13 is set in any desired position, as shown, either for full capacity or for less capacity. The wall 13 moves inward parallel to the series of rollers 31 and as it is moved inward, it cuts out from effective action one or more of the lower rollers so that the number of rollers which are effective is reduced. By moving the wall still further inward, the capacity is still further reduced. Thus it will be seen that any desired adjustment may be made to the wall 13 to give the amount of stock required for any given machine and thus reduce or increase the capacity of the machine, depending upon the number of other machines which are to be fed. We have shown our invention as applied to a particular form of breaker or feeder, but obviously the principle of the invention may be readily adapted to fit other forms of feeders, openers or breakers.

The doffer 24 in its revolution knocks back any lumps of cotton that are too large and the member 30 also acts to prevent large lumps from passing over the top of the rollers. All the spiked rollers will run at the same speed and in the same direction, except the bottom one which runs faster due to the relatively large sprocket wheel which drives it. It is to be understood that when the movable back 13 is at the open position, there is considerable space or opening at the bottom through which the smaller lumps of cotton can drop, but that when this opening is closed to the half way position of the movable back, only one-half the amount can drop through, and when closed entirely only the stock passing between the rollers can reach the spiked apron.

We claim:—

1. In a feeder or opener for cotton or like materials including a hopper, an upwardly and rearwardly extending endless apron mounted adjacent the bottom of the hopper and having its lower end disposed in a horizontal plane, rollers supporting said endless apron, means for driving the endless apron, said apron having outwardly projecting spikes, an upwardly and rearwardly inclined series of spiked rollers disposed outward of the apron and parallel thereto, the rollers being so arranged that the spikes of one roller pass between the spikes of an adjacent roller, and means for driving said rollers.

2. In a feeder or opener for cotton or like materials, a hopper having a downwardly and forwardly inclined back wall and a horizontal lower wall, an endless apron disposed adjacent and parallel to the back and lower walls and thus having an upwardly and rearwardly inclined portion and a horizontal portion, rollers supporting said apron, a series of spiked rollers having shafts mounted in the lateral walls of said hopper, the series of spiked rollers being disposed in parallel relation to but spaced from the upper flight of said apron, means for driving the shaft of one of said rollers, means for transmitting power from said shaft to the shafts of the other rollers to cause said shafts to all rotate in the same direction, means for transmitting power to said endless conveyor comprising a sprocket wheel mounted upon one of the shafts of the endless conveyor, a sprocket wheel mounted upon one of the roller shafts, and a chain engaging said sprocket wheels.

3. In an opener and breaker of the character described, a hopper, a picking mechanism extending along the bottom of the hopper and means for controlling the output of said picking mechanism comprising a wall constituting one wall of the hopper and pivoted to the hopper, said wall being movable in a direction lengthwise of the picking mechanism and being adjustable in this direction to thus reduce or increase the exposed area of said picking mechanism.

4. In an opener and breaker of the character described, a hopper, a picking mechanism extending along the bottom of the hopper, means for controlling the output of said picking mechanism comprising a wall constituting one wall of the hopper and pivoted to the hopper, said wall being movable in a direction lengthwise of the picking mechanism and being adjustable in this direction to reduce or increase the exposed area of said picking mechanism, means for adjusting said wall comprising a lever having an arm operatively connected to the wall, and a latch for latching said lever in any adjusted position.

5. In a machine of the character described, a hopper having a downwardly and forwardly inclined bottom wall and a horizontal lower wall, a series of picking rollers disposed parallel to said rear wall, an endless spiked belt extending parallel to the rear wall and then parallel to the bottom wall and beneath the lower roller of the series, a wall pivoted at its upper end to the side walls of the hopper and at its lower end movable in a direction at right angles to the axes of the picking rollers, whereby to reduce the exposed area of said series of picking rollers, and means for shifting said wall inward or outward and holding it in its adjusted position.

6. In an opener and breaker of the character described, a hopper, a picking mechanism extending along the bottom of the hopper, and means for controlling the output of said picking mechanism comprising a wall constituting one wall of the hopper and pivoted at its upper end to the hopper, the lower end of the wall being movable in a direction toward or from the lower end of the picking mechanism and being adjustable to reduce or increase the exposed areas of the picking mechanism.

7. In a feeder or opener for cotton or the like material, a hopper having an upwardly and outwardly inclined wall, an endless spiked apron disposed parallel to the last named wall and adjacent thereto, a series of spiked rollers mounted adjacent the apron but between the apron and the mouth of the hopper, the rollers being so set that the spikes of one roller will pass between the spikes of an adjacent roller, and means for driving said rollers and simultaneously driving said apron.

In testimony whereof we hereunto affix our signatures.

JAMES E. MILLER.
JAMES A. CASH.